Patented June 30, 1931

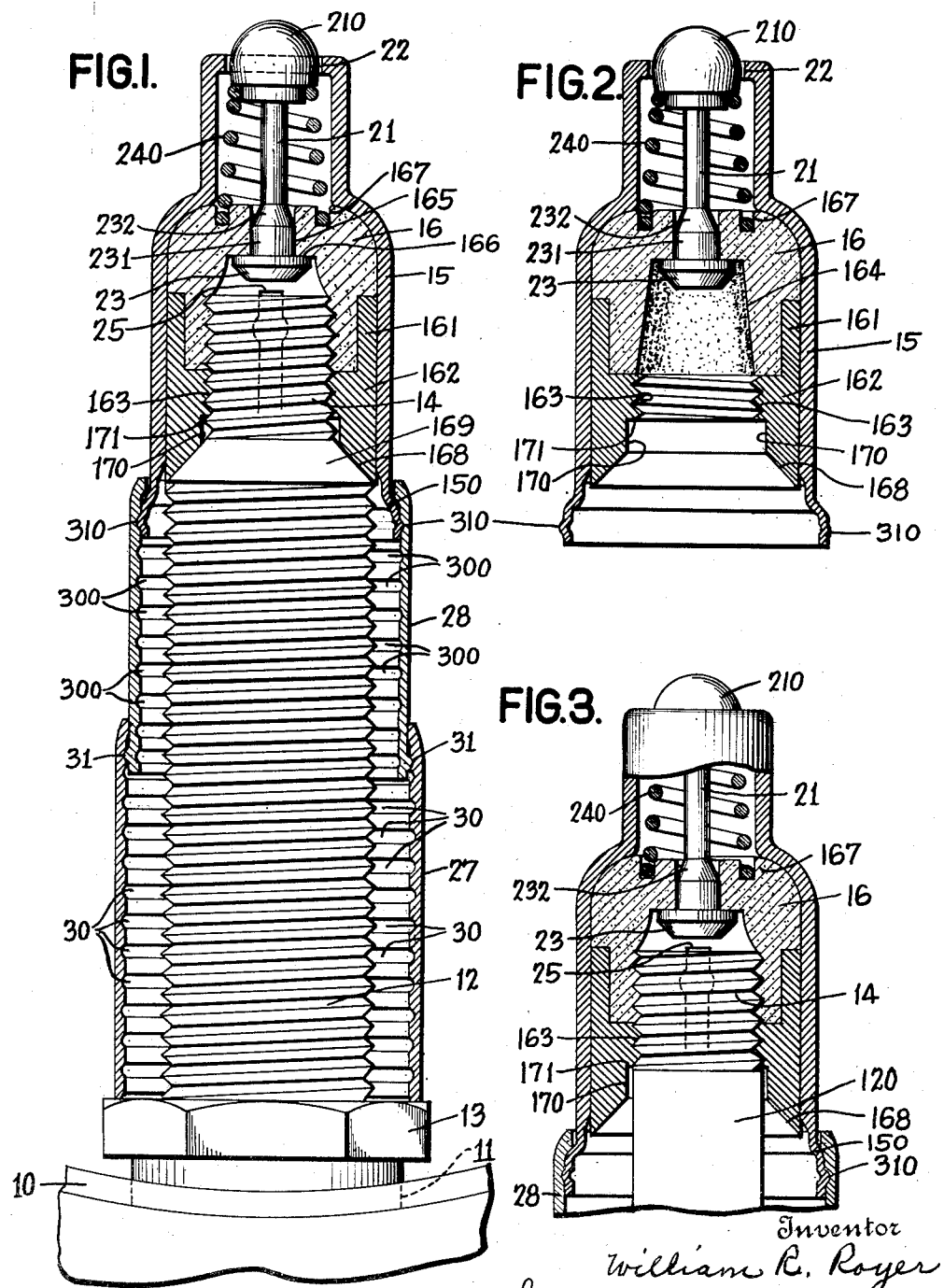

1,812,610

UNITED STATES PATENT OFFICE

WILLIAM R. ROYER, OF WYOMING, PENNSYLVANIA

AUXILIARY APPARATUS FOR TIRE VALVES

Application filed August 10, 1929. Serial No. 384,909.

This invention relates to valve mechanism for pneumatic tires. More specifically it relates to valve-operating and valve-protecting means and has for its objects to effect certain improvements in this type of apparatus which will appear upon disclosure of what I now consider a preferred form of my invention, features of novelty of which are asserted in the appended claims.

The structure illustrated and herein described embodies features of my invention disclosed and claimed in my United States Letters Patent No. 1,512,044, patented October 21, 1924, also embodies features of my invention disclosed and claimed in my co-pending application Serial No. 248,987, filed January 24, 1928, for United States Letters Patent, and, in addition, certain features of improvement hereinafter described and claimed.

Referring to the drawings:

Fig. 1 is a longitudinal section illustrating my device applied to a valve stem of a pneumatic tire of an automobile or other vehicle.

Fig. 2 is a view similar to Fig. 1 but with certain of the parts omitted, to avoid surplusage in illustration, and showing the appearance of certain of the parts before the device has been applied to any tire valve stem, and Fig. 3 is a view similar to Fig. 2 but showing the device applied to a tire valve stem which is different from the stem shown in Fig. 1.

In the drawings (Fig. 1), 10 is the felly of an automobile wheel, having an opening 11 for the valve stem 12 of the conventional form, which is threaded throughout its length to receive the nut 13 commonly used to exclude dirt, water, and other foreign matter from the hole 11. At its top or outer end the valve stem is reduced in diameter to provide the threaded nipple 14.

The cap 15, a hollow shell of brass, is provided with a washer 16 of rubber, preferably having the approximate density, toughness and durability of tire tread rubber, firmly held in its place in the cap, as shown, within the collar 161 of the brass nipple 162 press-fitted with the washer 16 into the cap 15. The nipple 162 is internally threaded at 163 to screw on and off the nipple 14 of the valve stem 12.

The washer 16 is provided with a tapered bore 164 (see Fig. 2) so that when the cap 15 is screwed (by means of its internally threaded nipple 162) onto the nipple 14 of the valve stem, the threads of the latter cut into the side walls of the washer 16 and the end of the valve stem bears strongly against the washer 16 but does not cut it (see Fig. 1).

A rod or plunger 21 has secured thereto at one end an operating head 210 of comparatively large cross-sectional exposed area and which projects through an opening 22 in the top of the cap 15. The other end of the plunger or rod 21 has secured thereto a valve disc 23 and this end of the rod 21 is enlarged at 231 and tapered at 232 for purposes presently appearing. The washer 16 is provided with a cylindrical bore 165 of less diameter than the smallest diameter of the bore 164 so as to provide a shoulder or seat 166 for the valve disc 23. The bore 165 serves as a guide for the lower portion of the valve rod 21 which is guided at its upper end by the head 210 in the bore 22 of the cap 15.

A coil spring 240, which encircles the rod 21, bears at one end against the under side of the head 210 and seats at its other end in an annular groove 167 provided in the washer 16. The spring 240, so mounted, yieldingly holds the disc 23 against its seat 166 (thereby normally sealing the passage 164—165 through the washer 16), and holds the rod 21 up out of engagement with the tire-valve plunger 25, which is a part of any suitable tire valve, not shown.

The nipple 162 is so constructed as to adapt my device to be applied either to the valve stem 12 shown in Fig. 1 or the valve stem 120 shown in Fig. 3. The diameter of the nipples 14 of both valve stems 12 and 120 is the same and standard—$\frac{5}{16}''$. However, the threads of the nipple 14 of the stem 12 run down $\frac{3}{8}''$ (i. e. the length af the threaded nipple is $\frac{3}{8}''$) while those of the stem 120 run down $\frac{1}{4}''$. The lower end of nipple 162 is tapered at 168 to be engaged by the tapered portion 169 of the stem 12 to act as a limiting stop whereby when the cap 15 and its contained mechanism is screwed home on the nipple 14, the proper distance between the lower face of the disc 23 and the upper end of the plunger 25 will be obtained. The nipple 162 is also provided with a cylindrical bore 170 and an annular shoulder 171 so that when the cap and its contained mechanism is applied to the stem 120 (Fig. 3), the stem 120 passes through the bore 170 and screw-stops against the shoulder 171 with the proper distance between the lower face of the disc 23 and the uper end of the plunger 25. It will therefore be seen that, by virtue of the special construction of the nipple 162, my device may be applied to either of the two types of valve stems 12 and 120 (Figs. 1 and 3) and the inflating cap is prevented by the screw-stop engagements described from screwing down beyond the proper distance between the lower surface of the disc 23 and the end of the valve stem nipple 14 with its valve "insides".

When the cap 15 and its contained mechanism above described is applied to the valve stem (as shown in Fig. 1 or Fig. 3) and it is desired to inflate the tire, it is only necessary to apply the air hose nozzle to the end of the cap 15. By virtue of the comparatively large cross-section of its exposed portion, the head 210 will accommodate varying sizes of air chucks. The depression of the head 210, by the application of the hose-nozzle, depresses the valve plunger 21, unseats the valve disc 23 and opens air communications from the opening 22 through the bore 165 into the bore 164. At the same time the plunger 21 depresses the valve plunger 25, thereby opening the tire valve and permitting the air to enter the tire. When the air-hose nozzle is removed the spring 240 raises the plunger 21, seats the valve disc 23 against the seat, and permits the plunger 25 to rise and close the tire valve. The last described position of parts, i. e. after the tire has been inflated, is shown in Figs. 1 and 3. The air in the tire is prevented from escaping through the stem 12 (or 120) to atmosphere by the tire valve and any air that may leak past the latter is prevented from escaping from the bore 164 of the washer 16.

By virtue of the illustrated and described construction of the washer 16 and the collar 161 and associated parts, the rubber washer locks firmly into the threads of the valve stem nipple 14 and against the end of the nipple 14, thereby effectively preventing air leakage from the bore or chamber 164 (except when the valve 23 is deliberately unseated for that purpose) and also preventing undesired loosening of the device from the valve stem nipple.

Certain types of tire valve caps employ washers that are so disfigured or demolished by successive applications to and removal from the stem that they are not airtight. With my device, this is not the case. While the nipple 14 cuts its own threads, so to speak, in the tapering bore 164 of the washer 16, i. e. the threads of the nipple cut into the side walls of the bore 164, the upper end of the valve stem bears strongly against the rubber washer 16 but does not cut it.

The other parts illustrated and which I am about to describe are substantially identical to corresponding parts disclosed in my said copending application Serial No. 248,987.

To cover and protect the valve stem 12 (Fig. 1) or 120 (Fig. 3) I provide a casing composed of a plurality of telescoping tubular members or sleeves or shells. One of these sleeves 150 is provided on the lower end of the cap 15. A second one of the sleeves, 28, is adapted telescopically to receive the cap 15 and its attached sleeve 150, and a third one of the sleeves, 27, is adapted telescopically to receive the second sleeve 28. By spinning or pressing out the lower end of the sleeve 150, or spinning or pressing in the upper end of the sleeve 28, (if the said sleeves taper upwardly), or both, (if the outside of the sleeve 150 and bore of the sleeve 28 are cylindrical, i. e. non-tapering), means are provided whereby the sleeve 150 (and attached cap 15) is limited in its upper or outer movement through the sleeve 28 and cannot be completely separated or disengaged therefrom by movement in that direction. Such means are shown in the drawings (Figs. 1 and 3). Similar means are provided so that the sleeve 28 cannot be completely separated or disengaged from the sleeve 27 by movement of the sleeve 28 upwardly or outwardly through the sleeve 27.

Means are provided for releasably holding the sleeves 150, 28 and 27, in various positions of relative adjustment and by virtue of which the assemblage of parts may readily be accommodated and/or adjusted to tire valve stems (12 or 120) of different lengths and releasably held in the adjusted position for forming an enclosing casing around the tire valve stem. Such means are illustrated in the drawings and constructed as follows:

The sleeve 27 is provided with a series of longitudinally spaced inner circumferential grooves 30 and the sleeve 28 is provided adjacent its lower end with a plurality of outwardly extending ribs 31 (shown as two in number and diametrically opposed) to cooperate with the aforesaid grooves 30. The metal walls of the sleeves 28 and 27 are sufficiently resilient to permit the ribs 31 to pass from one to another of the grooves 30 by manually moving the sleeves 28 and 27 relatively in a longitudinal direction and to hold or lock the said sleeves in the adjusted position with sufficient force to withstand the shocks and vibrations when in use upon the automobile wheel. The sleeves 28 and 150 are similarly provided with grooves 300 and ribs 310, respectively, similar in construction, function, and operation, to the grooves 30 and 31 above described.

The operation and advantages of the arrangements herein disclosed will be readily understood by those skilled in the art in view of the disclosure in my said Patent No. 1,512,044, and the foregoing description herein. While certain features disclosed and claimed in my said patent are employed in the device herein disclosed, it will now be appreciated that the latter embodies features of improvement. Thus, in addition to the advantages pointed out in connection with the mechanism within the cap 15, it will be noted that the entire assemblage constitutes a unit which may be applied to and removed from the tire valve stem 12 (or 120), as a unit, by the comparatively simple operation of merely screwing the cap 15 on the nipple 14 or unscrewing cap 15 from the nipple 14. By virtue of the clearance between the valve stem 12 (or 120) and the sleeves 27, 28 (and also, if desired, between the stem and the sleeve 150) the assemblage 15—28—27 may be shortened while the cap 15 is being screwed onto the nipple 14 or lengthened after the cap 15 has been screwed home on the nipple 14. This "unit" construction greatly facilitates application to and removal from the tire stem. Also, the valve 23 and its seat 166 are mounted well within the protecting casing, is less likely to be deranged, and is more reliable in its operation.

It is to be understood that the invention is not limited to the construction herein specifically illustrated and described, but can be embodied, within the scope of the following claims, in other forms without departure from its spirit.

What I claim is:

1. A valve cap for tire valve stems adapted to seal a valve stem when applied thereto and comprising in combination, a hollow metallic cap member provided with a threaded nut portion adapted to screw upon the threaded nipple of a valve stem, a resilient washer mounted in said member, said washer having a normally smooth bore adapted to be threaded by the threaded nipple of the valve stem to which the cap member is applied, a slidable valve rod mounted in said cap member, extending through said washer and guided in its sliding movements by said washer and adapted when depressed to open the valve within the tire valve stem to which the cap member is applied, to permit inflation of the tire without removal of the cap member from the stem, and a valve member on said valve rod within the cap member and adapted to seat against said washer normally to prevent escape of air through said washer.

2. The combination with a tire valve stem having a valve and a rod depressible for opening the valve, of an auxiliary valve including a cap fitting over the upper end of the tire valve stem, a valve rod reciprocable within the cap and movable to depress the rod of the tire valve, an operating head on the upper end of said second mentioned valve rod and which normally projects through an opening in the upper end of said cap, a rubber washer in said cap having a lower upwardly converging bore into which the threads of the nipple of the tire valve stem cut and a smaller upper bore communicating with the converging bore, a valve member secured to the lower end of said second mentioned valve rod and adapted to seat against the shoulder between the bores of the rubber washer, and a spring mounted within said cap between said operating head and said washer.

3. A valve cap for tire valve stems adapted to seal a valve stem when applied thereto and comprising in combination, a hollow metallic cap member provided with a threaded nut portion adapted to screw upon the threaded nipple of a valve stem which stem has a valve and valve rod therein, a resilient washer provided with a valve seat mounted in said member and adapted to be engaged by the end of the valve stem to which the cap member is applied, said valve seat being located beyond the end of said valve stem, a slidable valve rod mounted in said cap member, extending through said washer and guided in its sliding movements by said washer and adapted when depressed to open the valve within the tire-valve stem to which the cap member is applied, to permit inflation of the tire without removal of the cap member from the stem, and a valve member on said second mentioned valve rod within said cap member and adapted to seat against the seat on said washer normally to prevent escape of air through said washer, the end of the valve in said cap member being normally spaced from the rod of the valve in the valve stem, the valve within the valve stem being closed when the valve cap is applied on the valve stem and until the second mentioned valve rod is depressed to unseat the last mentioned valve member.

In testimony whereof I hereto affix my signature.

WILLIAM R. ROYER.